United States Patent
Fischer et al.

(10) Patent No.: US 10,271,676 B2
(45) Date of Patent: Apr. 30, 2019

(54) COFFEE MACHINE, IN PARTICULAR FULLY AUTOMATIC COFFEE MACHINE, AND METHOD FOR OPERATING A COFFEE MACHINE

(71) Applicant: Eugster/Frismag AG, Amriswil (CH)

(72) Inventors: Daniel Fischer, Romanshorn (CH); Wolfgang Riessbeck, Landschlacht (CH)

(73) Assignee: Eugster/Frismag AG, Amriswil (CH)

( * ) Notice: Subject to any disclaimer, the term of this patent is extended or adjusted under 35 U.S.C. 154(b) by 0 days.

(21) Appl. No.: 14/352,434

(22) PCT Filed: Oct. 15, 2012

(86) PCT No.: PCT/EP2012/070402
§ 371 (c)(1),
(2) Date: Apr. 17, 2014

(87) PCT Pub. No.: WO2013/057071
PCT Pub. Date: Apr. 25, 2013

(65) Prior Publication Data
US 2014/0348996 A1    Nov. 27, 2014

(30) Foreign Application Priority Data

Oct. 19, 2011   (DE) .................. 10 2011 054 601

(51) Int. Cl.
*A47J 31/36*   (2006.01)
*A47J 31/34*   (2006.01)
(Continued)

(52) U.S. Cl.
CPC ............... *A47J 31/36* (2013.01); *A23F 5/267* (2013.01); *A47J 31/34* (2013.01); *A47J 31/46* (2013.01); *A47J 31/60* (2013.01)

(58) Field of Classification Search
CPC .......... A47J 31/60; A47J 31/46; A47J 31/401; A47J 31/36; A47J 31/402; A47J 31/00;
(Continued)

(56) References Cited

U.S. PATENT DOCUMENTS 3,338,153 A * 8/1967 Holstein ............... A47J 31/32
                                                   137/240
5,660,802 A * 8/1997 Archer .................. C02F 1/505
                                                   137/268
(Continued)

FOREIGN PATENT DOCUMENTS

CH        665945 A5    6/1988
CN       101039612    9/2007
(Continued)

OTHER PUBLICATIONS

Translatory, www.merriam-webster.com/dictionary/translatory, retrieved online May 29, 2018. (Year: 2018).*
(Continued)

*Primary Examiner* — Hong T Yoo
(74) *Attorney, Agent, or Firm* — Bachman & LaPointe, PC

(57) ABSTRACT

A coffee machine (10), in particular a fully automatic coffee machine, comprising a water tank (11), also a heating device (16) for heating up water, also a brewing unit (18) for subjecting ground coffee beans to extraction by means of the water heated by the heating device (16), also a water-line system (13) comprising at least one water line, and also a delivery pump (14) for delivering water out of the water tank (11) through the water-line system (13). According to the invention, it is provided that a chamber (25) is, or may be provided for a chemical active substance, in particular a decalcifying and/or cleaning agent, it being possible for this chamber to be connected and/or linked up to the water-line system (13), manually or automatically, such that water can (Continued)

be delivered out of the water tank (11), by means of the delivery pump (14), into the water-line system (13) through the chamber (25). The invention also concerns a method for operating a coffee machine (10).

12 Claims, 2 Drawing Sheets

(51) Int. Cl.
*A47J 31/60* (2006.01)
*A23F 5/26* (2006.01)
*A47J 31/46* (2006.01)

(58) Field of Classification Search
CPC ...... A47J 31/40; A47J 31/3676; A47J 31/404; B67D 1/07; B67D 1/0043; A61L 2/24
See application file for complete search history.

(56) References Cited

U.S. PATENT DOCUMENTS

| | | | |
|---|---|---|---|
| 6,786,356 | B2 | 9/2004 | Geiger et al. |
| 8,333,144 | B2 | 12/2012 | Boussemart et al. |
| 8,337,635 | B2 | 12/2012 | Boussemart |
| 8,585,827 | B2 | 11/2013 | Boussemart |
| 8,770,099 | B2 | 7/2014 | Reyhanloo |
| 9,023,205 | B2 | 5/2015 | Namur |
| 2008/0121581 | A1 | 5/2008 | Namur |
| 2009/0183754 | A1 | 7/2009 | Vetterli et al. |
| 2010/0128557 | A1 | 5/2010 | Agon et al. |
| 2011/0094541 | A1 | 4/2011 | Douma |

FOREIGN PATENT DOCUMENTS

| | | |
|---|---|---|
| CN | 101947061 | 1/2011 |
| CN | 101980641 | 2/2011 |
| DE | 10059183 A1 | 6/2002 |
| DE | 102004049876 A1 | 4/2006 |
| DE | 102008003733 A1 | 7/2009 |
| DE | 202009007946 U1 | 9/2009 |
| DE | 102010010516 A1 | 9/2011 |
| WO | 2009124786 A1 | 10/2009 |

OTHER PUBLICATIONS

Chinese Patent Apln. No. 201280051458.9 office action dated Aug. 20, 2015.

* cited by examiner

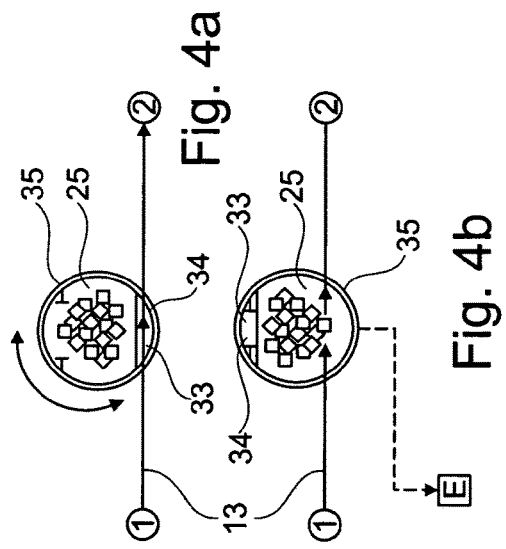
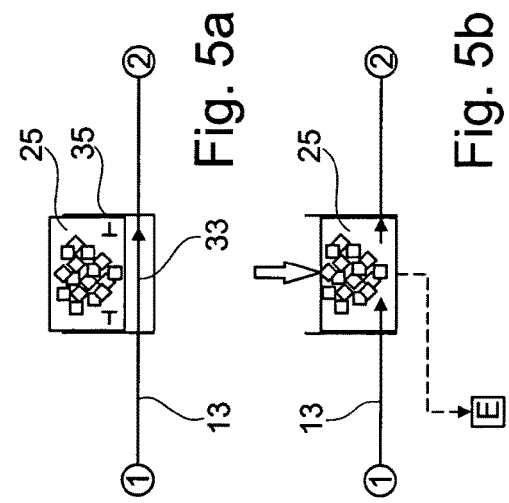
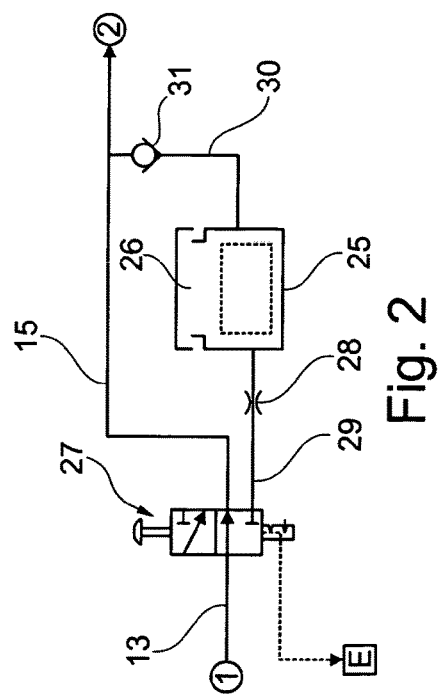
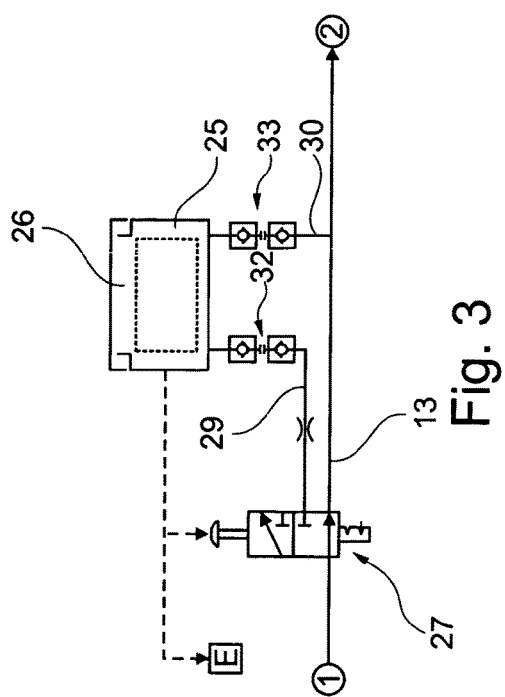

COFFEE MACHINE, IN PARTICULAR FULLY AUTOMATIC COFFEE MACHINE, AND METHOD FOR OPERATING A COFFEE MACHINE

BACKGROUND OF THE INVENTION

The invention relates to a coffee machine, in particular a fully automatic coffee machine comprising a water tank, a heating device for heating water, a brewing unit for leaching out ground coffee beans via the water heated in the heating device, a water line system encompassing at least one water line, as well as a feed pump for conveying water out of the water tank through the water line system.

Fully automatic coffee machines are generally known. The latter encompass a water tank, a heating device, a brewing unit along with a feed pump, with which water can be conveyed from the water tank via the heating device and into the brewing unit, in which ground coffee (ground coffee beans) can be leached out with the heated water. The coffee product then exits the brewing unit toward the beverage cup. Most of the time, fully automatic coffee machines also have a coffee bean storage container along with an integral grinder, in which coffee beans can be freshly ground, to then be supplied to the brewing unit prior to a brewing process. Additionally known are fully automatic coffee machines that also exhibit a steam generating unit and/or a milk froth generating unit. Known fully automatic coffee machines must be decalcified and cleaned at regular intervals. In order to decalcify fully automatic coffee machines, it is common practice to add decalcifying agents to the water tank, wherein decalcifying agents are often used in the form of tablets, which according to manufacturer instructions must be suitably dissolved in water before added to the water tank. In practice, however, decalcifying tablets are frequently dissolved in the water container. Given an incorrect dissolution or premature start of the decalcifying process, this in turn causes as yet undissolved decalcifying agent to be conveyed into the water line system, where it can lead to deposits and other disadvantages. In known fully automatic coffee machines, the water tank must be manually cleaned after the decalcifying process, so as to prevent coffee product from becoming contaminated by decalcifying agent after a decalcifying process. In order to clean fully automatic coffee machines, in particular to dissolve grease in the brewing unit, it is known to directly add a cleaning tablet to the brewing unit, which then dissolves in the brewing unit.

SUMMARY OF THE INVENTION

Proceeding from the above prior art, the object of the invention is to indicate an improved coffee machine along with a method for operating the latter, which are more convenient to decalcify and/or clean. In particular, the object is to prevent the chemical active ingredient to be used from contaminating the water tank, and/or ensure that the chemical active ingredient is completely dissolved/mixed.

In a coffee machine with the features disclosed herein, this object is achieved in a generic coffee machine by providing a chamber for a chemical active ingredient, in particular a decalcifying and/or cleaning agent, which can be manually or automatically hooked up and/or connected to the water line system of the coffee machine in such a way that water can be conveyed out of the water tank via the feed pump through the chamber and into the water line system, in particular to the heating device and/or brewing unit.

In terms of the method, the object is also achieved with the features disclosed herein.

Advantageous further developments of the invention are indicated in the subclaims. Included within the framework of the invention are all combinations of at least two features disclosed in the specification, claims and/or figures. In order to avoid repetition, features disclosed for the device are to also apply as disclosed and claimable for the method. Likewise, features disclosed for the method are to also apply as disclosed and claimable for the device.

The invention is based on the idea of not adding the chemical active ingredient for maintaining the coffee machine, in particular for decalcifying and/or cleaning it, to the in particular removably arranged water tank and/or, in the case of a cleaning agent, to the brewing chamber, as previously, but instead (in addition to the water tank) to provide a special (active ingredient) chamber and/or an optional hookup for such a chamber for the chemical active ingredient, in particular a decalcifying and/or cleaning agent, wherein the chamber preferably filled with the active ingredient can be hooked up and/or connected to the water line system in such a way that the water can be conveyed out of the water tank via the feed pump through the chamber and into the water line system, wherein the chemical active ingredient, preferably dissolved in water, is also transported during this passage through the chamber, so as to then have its intended effect in the water line system, in particular the brewing unit and/or heating unit. To this end, the chamber preferably exhibits a water inlet and water outlet, which, as will be explained later on, is further preferably equipped with a check valve. As will be explained later on, a chamber fixedly integrated into the coffee machine can be provided, which can be hooked up to the water line system, for example by way of an adding valve that can be activated via a control unit, e.g., so as to initiate a decalcifying and/or cleaning process. It is also possible to provide a chamber in the form of a container that can be removed from the coffee machine, for example to fill the latter with a chemical active ingredient. The chamber provided in the container can then preferably be hooked up to the water line system by placing it inside the coffee machine and, depending on the configuration, either carry a flow directly, or be connected by way of an adding valve. As will be explained later on, it is also conceivable to use one-way chambers, in particular one-way containers, which can be purchased filled with chemical active ingredient, and contain the chemical active ingredient for at least one process, preferably several processes, and which can be changed out once the chemical active ingredient has been expended. As will be explained later on, it is also conceivable for a chamber in the coffee machine to be adjustable between a connected position, in which the chamber can either directly carry a flow or be hooked up, and a position not connected with the water line system.

Taken as a whole, the coffee machine according to the invention along with the method for operating the latter offers an especially convenient way of cleaning and/or decalcifying the coffee machine. In particular, a suitable program controller for the process to be initiated can ensure that the active ingredient, for example added to the chamber in tablet form, is completely dissolved and/or mixed with water. A significant advantage to a coffee machine designed according to the concept of the invention is that the chemical ingredient need not be directly added to the water tank, thus eliminating the need to separately rinse and/or clean the water tank. It is also possible and preferable that the chamber incorporate enough active ingredient for several active processes, in particular decalcifying and/or cleaning processes. Depending on the composition of the chemical active ingredient, it can be provided that the latter only flow to specific units of the coffee machine, made to do so in particular by suitably switching the valves. For example, in the case of decalcifying agents, it may be necessary or sensible to only convey the latter through the heating device, but not through the brewing unit.

While it is basically possible and preferred when hooking up and/or connecting the chamber that the entire stream of water generated by the feed pump flow through the chamber, an alternative embodiment is also conceivable, in which only a partial volumetric flow of the conveyed water flows through the chamber, and another part is bypassed, and that preferably both partial flows are merged back together again in an area lying behind the chamber.

The adjustment between a connected position and unconnected position can take place manually or automatically, for example by means of an electromotive adjustment drive. In like manner, an optionally provided adding valve can be manually or automatically activated.

As already indicated, one possibility has to do with fixedly integrating the chamber into the coffee machine, wherein the chamber preferably has allocated to it an opening and/or a cover or seal, so that the chamber can be filled with a chemical active ingredient and preferably closed again. As an alternative, the chamber, in particular in the form of a container, can be removed from the coffee machine, for example so that it can be filled and/or cleaned in the removed state. It is also conceivable for the chamber to be designed as a disposable container. Given a removable and/or adjustable arrangement, suitable coupling connections are preferably provided on the chamber for coupling with an inlet and outlet. A check valve is allocated to at least one of these connections to prevent the chamber from emptying in the removed or adjusted (unconnected) state.

There are two alternatives with regard to arranging the chamber relative to the feed pump. Both alternatives share in common that the chamber must be situated downstream from the water tank in the direction of water flow. While the chamber can be arranged both on the intake side of the pump or the discharge side of the feed pump, it is preferably situated before the heating device and/or brewing unit in the direction of water flow.

As already indicated at the outset, it is conceivable for the coffee machine to be designed in such a way that the coffee machine, if the chamber is configured as a removable chamber or a chamber that can be adjusted between two positions, a stream flows directly through the chamber with the feed pump in operation if the chamber is inserted or located in a connected position, i.e., no additional hookup is required in this case. Of course, a manually or automatically activatable adding valve can be provided if needed. In the case of fixed integration, such an adding valve is required to prevent water from flowing through the chamber during normal operation (brewing operation). When an adding valve is provided, it can be adjusted between at least two switching positions, specifically between a first switching position in which water can be conveyed in the water line system while circumventing the chamber, and a second switching position in which the chamber is hooked up, and the stream of water conveyed by the feed pump can be partially or completely conveyed through the chamber.

It especially makes sense to allocate a metering valve designed in the simplest case as a restrictor valve to the chamber, in particular on the inlet side, with which the quantity of water to be conveyed through the chamber is or can be preset. Additionally or alternatively, a check valve can be allocated to the chamber, in particular on the outlet side, so as to prevent water from being conveyed in from the rear side of the chamber during normal operation. Additionally or alternatively, a check valve can also be provided on the inlet side, in particular given a removable chamber.

As already explained, one possible embodiment of the coffee machine involves being able to adjust the chamber in or on the coffee machine between at least two positions, for example rotationally or translatorily. The chamber is here decoupled from the water line system allocated to the feed pump in the first position, and hooked up to the water line system in the second position, wherein various possible configurations can again be realized in the second position, specifically a first one in which the chamber automatically carries a flow in the second position with the pump in operation, and another alternative in which an optional adding valve must be opened beforehand.

In the case of an adjustably situated chamber, it is preferred that the chamber be directly adjusted to open a bypass line in the first position so as to circumvent the chamber, and close it in the second position.

In a further development, the coffee machine encompasses a control unit, with which a cleaning and/or decalcifying process can be initiated as water flows through the chamber. For example, the control unit can here activate the feed pump and actuate any adding valve that may be present so that it opens the inflow into the chamber. For example, the control unit can start the cleaning and/or decalcifying process in response to a manual instruction, in particular in response to activating input devices and/or, given an adjustable arrangement of the chamber, in response to being adjusted to a connected position or, given a chamber with a removable design, in response to placing the chamber in a fluidically connected position. Additionally or alternatively, the control unit can automatically start the cleaning and/or decalcifying process, for example once a period of time has elapsed and/or a defined event has arisen, for example after a specified or specifiable number of coffee products has been purchased.

The invention further relates to a method for operating a coffee machine preferably designed as described above. It especially makes sense for the coffee machine to encompass an integral grinder and/or or steam generating unit and/or a milk froth generating unit. The method encompasses the step of manually or automatically filling a chamber of the coffee machine with a chemical active ingredient, or alternatively inserting a chamber manually filled or prefilled with a chemical active ingredient, e.g., then making it a disposable chamber. The method further encompasses the step of manually or automatically hooking up and/or connecting the chamber to the water line system, wherein the connection can already be established via the aforementioned insertion or adjustment. For example, an optional adding valve can be connected by inserting or adjusting a chamber. An essential step in the method lies in transporting water from the water tank through the chamber via the feed pump, thereby introducing active ingredient into the water line system from the chamber.

BRIEF DESCRIPTION OF THE DRAWINGS

Additional advantages, features and details of the invention may be derived from the following description of preferred exemplary embodiments, as well as from the drawings.

The latter show:

FIG. 2: A possible embodiment for the arrangement of the chamber as a chamber permanently integrated/built into the fluid system;

FIG. 3: An alternative embodiment for the arrangement or configuration of the chamber as a removable container;

FIG. 4: Another alternative embodiment of the chamber arrangement or configuration as a chamber that can be adjusted, here rotationally, and FIG. 5: An alternative, translatorily adjustable arrangement of the chamber.

Elements that are the same and have the same function are labeled with the same reference numbers.

DETAILED DESCRIPTION

Figure 1:
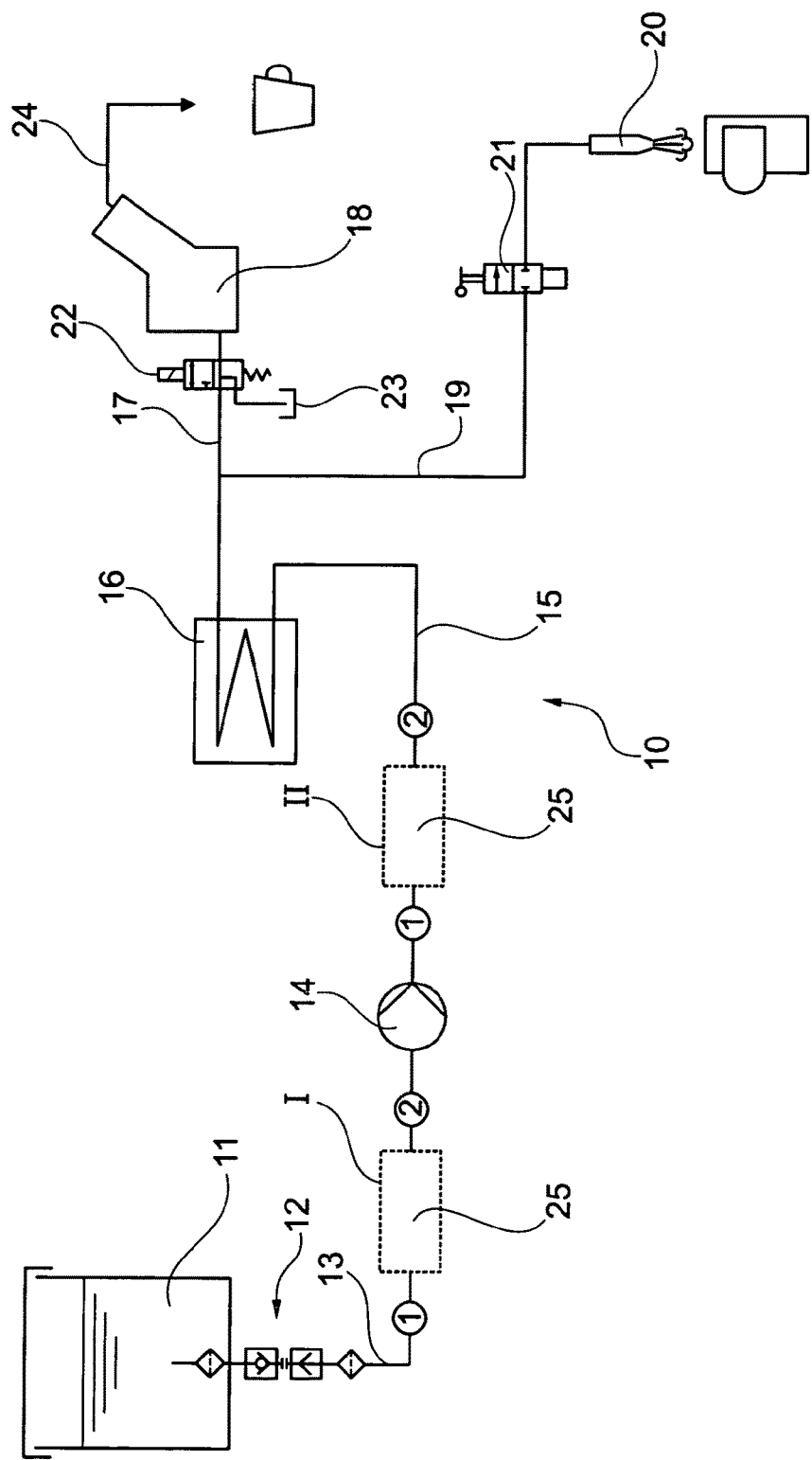
FIG. 1: The schematic structural design of a coffee machine with two alternative positions for an active ingredient.

Shown labeled with reference number 10 on FIG. 1 is the principle structural design of a coffee machine 10. The latter encompasses a removably arranged water tank having allocated to it a coupling valve 12. The water tank is connected by way of the coupling valve 12 to a water line system 13, in which water from the water tank 11 can be conveyed via a feed pump 14. A line 15 of the water line system 13 leads from the water tank 11 by way of the feed pump 14 to a heating device 16 (thermoblock), and thereafter splits into a line 17 leading to the brewing unit 18 and a line 19 leading to steam generator 20. Situated upstream from the latter is a valve 21. A drainage valve 22 is allocated to the brewing unit 18 in a known manner, and can be used to connect the brewing unit 18 in a fluid conducting manner with a collecting tray 23, for example to press out the pomace after a brewing operation. An outlet channel 24 leads out of the brewing unit 18 and to a drinking container. If needed, the brewing unit 18 can have allocated to it a grinder (not shown) for freshly grinding coffee beans from a coffee bean storage container.

Located to the left of the feed pump 14 in the drawing plane is a first possible position 1 for a (n active ingredient) chamber 25. The latter is on the suction side in relation to the feed pump 14. Located to the right of the feed pump in the drawing plane is an alternative position 2 for such a chamber 25. In positions 1 and 2, the chamber 25 is situated between respective points 1 and 2. Alternative embodiment variants for positions 1 and/or 2 will be described below based upon FIGS. 2 to 5.

FIG. 2 depicts a possible situation in which the chamber is fixedly integrated into the coffee machine 10 for holding a chemical active ingredient, in particular a cleaning and/or decalcifying agent. The chamber 25 encompasses a sealable opening 26, through which the chemical active ingredient can be added if needed, in particular when prompted by the coffee machine 10. Located upstream from the chamber 25 in the direction of water flow is an adding valve 27, with which the chamber 25 can be hooked up to the water line system 13, preferably controlled by a control device (not shown), in such a way that, with a connection established, water can be drawn or forced through the chamber 25 via the conveying device shown on FIG. 1. Situated between the adding valve 27 and chamber 25 is a metering valve 28 designed as a restrictor, which is built into a feed line 29 that connects the adding valve 27 with the chamber 25. An outlet line 30 through which the water with active ingredient can flow into the water line system 13 is equipped with a check valve 31 to not allow water to flow into the chamber 25 from the rear side during normal operation. In the exemplary embodiment shown, the adding valve 27 can be adjusted between two switching positions, specifically a switching position in which the chamber 25 is connected, and water can flow into the chamber 25 through the feed line 29, there entrain or absorb the active ingredient, and flow out through the outlet line 30 and into the water line system 13 again. In the other switching position, the feed line 29 is blocked, and water flows through line 15.

The adding valve can be activated manually or electrically, wherein activating the adding valve triggers a signal that starts the decalcifying process E in the exemplary embodiment shown.

The exemplary embodiment according to FIG. 3 differs from the exemplary embodiment shown on FIG. 2 and described in this conjunction in that the chamber 25 is not fixedly built into the coffee machine 10, but instead removably arranged. To this end, the feed line 29 and outlet line 30 each integrate a coupling 32, 36, which makes it possible to couple and decouple the chamber 25 and water line system 13. In the exemplary embodiment shown, an adding valve 27 is placed upstream from the chamber 25, similarly to the exemplary embodiment according to FIG. 2, and can be used to connect the chamber 25 to the water line system 13. In the configuration according to FIG. 2, the adding valve 27 can conceivably be omitted, since the check valves of the couplings 32, 33 prevent water from exiting from the feed line 29 and outlet line 30 with the chamber 25 removed. However, a design with adding valve 27 is preferred. The arrangement according to FIG. 3 is configured in such a way that, by inserting and thus connecting the chamber 25, for example by way of a pressure switch, a signal that starts the decalcifying process E is generated to the control unit, in response to which the adding valve 27 is also changed over.

FIG. 4 presents an alternative configuration for the chamber situation. The exemplary embodiment encompasses a chamber 25 that can here be rotationally adjusted inside the coffee machine 10 manually or automatically, for example with an electric motor, and adjusted between the position not hooked up to the water line system depicted on FIG. 4a and a connected position shown on FIG. 4b. In the exemplary embodiment according to FIGS. 4a and 4b, an extra adding valve was intentionally omitted, wherein the latter can also be provided as needed, for example similarly to FIG. 3.

A bypass line 33 is activated in the position shown on FIG. 4a, and in the exemplary embodiment depicted is comprised of a flow chamber 34 of a rotatable container 35 that envelops the chamber 25. If the container 35 is turned around a rotational axis, the chamber 25 is connected to the water line system 13, and can automatically carry a flow of water, as shown on FIG. 4b. Rotating the chamber 25, more precisely the container 35, from the position on FIG. 4a into the position on FIG. 4b, for example by means of a pressure or position switch, generates a signal that initiates the decalcifying process E, in response to which the control unit starts up the feed pump, for example.

The exemplary embodiment according to FIGS. 5a and 5b operates based on the same principle as the exemplary embodiment according to FIGS. 4a and 4b, except that the chamber can be adjusted not rotationally, but translatorily, between the position decoupled from the water line system 13 depicted on FIG. 5a and the position hooked up to the water line system 13 depicted on FIG. 5b. In the position shown on FIG. 5a, a bypass line is formed by a container 35. The bypass line 33 is interrupted or bridged on FIG. 5b by the chamber 25 with active ingredient then connected to the water line system 13.

The invention claimed is:

1. A coffee machine (10), comprising a water tank (11), a heating device (16) for heating water, a brewing unit (18) for leaching out ground coffee beans via water heated in the heating device (16), a water line system (13) encompassing at least one water line, as well as a feed pump (14) for conveying water out of the water tank (11) through the water line system (13), and a chamber (25) for a chemical active ingredient, wherein the chamber (25) is selectably connected along the water line system (13) in such a way that when the chamber (25) is connected, operation of the pump (14) conveys water out of the water tank (11) via the feed pump (14) through the chamber (25) and into the water line system (13), and when the chamber (25) is not connected, operation of the pump conveys water out of the water tank (11) via the feed pump (14), into the water line system (13) to the brewing unit (18) without passing through the chamber (25) and wherein the chamber is selectively connected by being adjustable between a first position wherein the chamber is decoupled from the water line system (13) and a second position in which the chamber (25) is connected to the water line system (13), and wherein the chamber (25) is adjustable by moving the chamber (25) translatorily.

2. The coffee machine (10) according to claim 1, wherein the chamber (25) is arranged on an intake side or discharge side of the feed pump (14).

3. The coffee machine (10) according to claim 1, wherein the chamber (25) has at least one of a metering valve (28) on its inlet side, or a check valve (31) on its inlet or outlet side.

4. The coffee machine (10) according to claim 1, wherein the coffee machine (10) exhibits a control unit designed to initiate a cleaning process in response to a manual instruction, or automatically, during which water is conveyed through the chamber (25).

5. The coffee machine (10) according to claim 4, wherein the manual instruction comprises activation of input devices or adjusting or inserting the chamber (25).

6. The coffee machine (10) according to claim 4, wherein the control unit initiates the cleaning process automatically once a period of time has elapsed or a defined event has arisen or following a fully automatic adjustment.

7. A method for operating the coffee machine (10) according to claim 1 comprising the following steps:
   filling the chamber (25) with a chemical active ingredient, and/or insertion of a chamber (25) manually filled or already prefilled with the chemical active ingredient;
   adjusting the chamber from the first position in which the stream of water conveyed by the feed pump cannot flow through the chamber into the a second position in which water can flow through the chamber;
   conveying water out of the water tank in the water line system (13) through the chamber (25) via the feed pump (14), thereby introducing the chemical active ingredient into the water line system (13).

8. The method according to claim 7, wherein the active ingredient is conveyed through the heating device (16) and/or brewing unit (18), or exclusively through the heating device (16) and not through the brewing unit (18), or exclusively through the brewing unit (18) and not through the heating device (16).

9. The method according to claim 7, wherein the chemical active ingredient is a decalcifying and/or cleaning agent.

10. The coffee machine (10) according to claim 1, wherein the chemical active ingredient is a decalcifying and/or cleaning agent.

11. The coffee machine (10) according to claim 1, wherein the chamber (25) has allocated to it an adding valve (27) that is adjustable between a first switching position in which the stream of water conveyed by the feed pump is completely conveyed in the water line system while circumventing the chamber (25), and a second switching position in which the chamber (25) is hooked up, and the stream of water conveyed by the feed pump is partially or completely conveyed through the chamber (25).

12. The coffee machine (10) according to claim 1, wherein the chamber (25) is adjustable by being movable between the first position and the second position, and wherein, in the first position, the stream of water conveyed by the feed pump is completely conveyed in the water line system while bypassing the chamber, and in the second position the stream of water conveyed by the feed pump is at least partially conveyed through the chamber.

* * * * *